US010713390B2

(12) United States Patent
Anderson et al.

(10) Patent No.: US 10,713,390 B2
(45) Date of Patent: Jul. 14, 2020

(54) REMOVING SENSITIVE CONTENT FROM DOCUMENTS WHILE PRESERVING THEIR USEFULNESS FOR SUBSEQUENT PROCESSING

(71) Applicant: Microsoft Technology Licensing, LLC, Redmond, WA (US)

(72) Inventors: Curtis Dean Anderson, Kent, WA (US); Robert Leslie Rounthwaite, Redmond, WA (US); Michael Dean Stokes, Eagle, ID (US); Mari Jean Broman Olsen, Bellevue, WA (US); Michelle Elena Keslin, Kirkland, WA (US); Erik Thomas Oveson, Renton, WA (US); Tomasz Lukasz Religa, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 15/650,991

(22) Filed: Jul. 17, 2017

(65) Prior Publication Data

US 2019/0018983 A1 Jan. 17, 2019

(51) Int. Cl.
G06F 11/00 (2006.01)
G06F 21/64 (2013.01)
(Continued)

(52) U.S. Cl.
CPC .......... *G06F 21/64* (2013.01); *G06F 21/6245* (2013.01)

(58) Field of Classification Search
CPC . G06F 21/64; G06F 21/6245; H04L 2209/16; H04L 63/0428; H04L 63/1408;
(Continued)

(56) References Cited

U.S. PATENT DOCUMENTS 6,631,482 B1 * 10/2003 Marks ................... G06F 21/62
714/38.14
9,065,643 B2 6/2015 Hurry et al.
(Continued)

FOREIGN PATENT DOCUMENTS

EP 1669905 A2 6/2006

OTHER PUBLICATIONS

Bier, et al., "The Rules of Redaction: Identify, Protect, Review (and Repeat)", In Journal of IEEE Security & Privacy, vol. 7, issue 6, Nov. 1, 2009, pp. 46-53.
(Continued)

*Primary Examiner* — Gary S Gracia
(74) *Attorney, Agent, or Firm* — Rainier Patents, P.S.

(57) ABSTRACT

A computer-implemented technique is described herein for removing sensitive content from documents in a manner that preserves the usefulness of the documents for subsequent analysis. For instance, the technique obscures sensitive content in the documents, while retaining meaningful information in the documents for subsequent processing by a machine-learning engine or other machine-implemented analysis mechanisms. According to one illustrative aspect, the technique removes sensitive content from documents using a modification strategy that is chosen based on one or more selection factors. One selection factor pertains to the nature of the processing that is to be performed on the documents after they have been anonymized.

21 Claims, 9 Drawing Sheets

(51) Int. Cl.
*G06F 21/62* (2013.01)
*G06F 12/14* (2006.01)

(58) Field of Classification Search
CPC .. H04L 63/1416; H04L 63/1441; H04L 63/20
USPC .......................... 726/1, 26; 715/230; 714/45
See application file for complete search history.

(56) References Cited

U.S. PATENT DOCUMENTS

| | | | |
|---|---|---|---|
| 9,195,808 B1* | 11/2015 | Nestler | G06F 21/10 |
| 9,489,354 B1 | 11/2016 | Lee et al. | |
| 2009/0164881 A1* | 6/2009 | Segarra | G06F 21/6245 |
| | | | 715/230 |
| 2010/0046015 A1* | 2/2010 | Whittle | G06F 3/1222 |
| | | | 358/1.9 |
| 2012/0159637 A1 | 6/2012 | Dove et al. | |
| 2012/0303558 A1* | 11/2012 | Jaiswal | G06N 20/00 |
| | | | 706/12 |
| 2012/0304304 A1* | 11/2012 | Avrahami | G06F 21/10 |
| | | | 726/27 |
| 2013/0144901 A1* | 6/2013 | Ho | G06F 16/248 |
| | | | 707/769 |
| 2014/0019586 A1 | 1/2014 | Saxena et al. | |
| 2014/0208418 A1 | 7/2014 | Libin | |
| 2015/0089357 A1* | 3/2015 | Vandervort | G06F 40/166 |
| | | | 715/256 |
| 2016/0063269 A1 | 3/2016 | Liden et al. | |
| 2016/0110352 A1 | 4/2016 | Bendersky et al. | |
| 2016/0117495 A1* | 4/2016 | Li | G06F 21/31 |
| | | | 726/1 |
| 2016/0132277 A1 | 5/2016 | Csurka et al. | |
| 2016/0165054 A1* | 6/2016 | Cudak | H04M 3/42357 |
| | | | 455/414.1 |
| 2016/0321462 A1* | 11/2016 | Bhogal | G06F 16/93 |
| 2017/0034095 A1* | 2/2017 | Kamalakantha | G06F 21/6227 |
| 2017/0193157 A1* | 7/2017 | Quirk | G16B 20/00 |
| 2017/0249466 A1* | 8/2017 | Ben-Yair | G06F 21/60 |
| 2017/0337168 A1* | 11/2017 | Kunze | H04L 67/42 |

OTHER PUBLICATIONS

"International Search Report and Written Opinion issued in PCT Application No. PCT/US2018/034807", dated Aug. 23, 2018, 14 Pages.

"Redaction of Confidential Information in Electronic Documents," available at <<https://www.wired.com/images_blogs/threatlevel/2009/12/redaction.pdf>>, in Technical Note, Adobe Systems Incorporated, San Jose, CA, accessed on Jun. 28, 2017, 13 pages.

Russell, Jon, "Evernote reverses privacy policy that allows employees to read users' notes," available at <<https://techcrunch.com/2016/12/16/evernote-u-turn/>>, TechCrunch, Dec. 16, 2016, 5 pages.

* cited by examiner

Summary of Proposal page 1 of 10

John S. Smith
Date: 10/11/2017

Table of Contents
Introduction . . . . . . . . . . . . . . . . . . . . . . . . . . . . . . . . . . . . . . . . . . . 1
East Coast Simulation . . . . . . . . . . . . . . . . . . . . . . . . . . . . . . . . . 3
Results of East Coast Simulation . . . . . . . . . . . . . . . . . . . . . . . . . 7
Conclusions for Design Team . . . . . . . . . . . . . . . . . . . . . . . . . . 11

Online Results
http://www.AcmeCo.com/simulations/eastcoastSept2017.html

 *John in Richmond, VA*

502

Xxxxxxx xx Xxxxxxxx xxxx 0 xx 00

Xxxx X. Xxxxx
Xxxx: 00/00/0000

Xxxxx xx Xxxxxxxx
Xxxxxxxxxxx . . . . . . . . . . . . . . . . . . . . . . . . . . . . . . . . . . . . . . . . . 0
Xxxx Xxxxx Xxxxxxxxx . . . . . . . . . . . . . . . . . . . . . . . . . . . . . . . . 0
Xxxxxx xx Xxxx Xxxxx Xxxxxxxxx . . . . . . . . . . . . . . . . . . . . . . 0
Xxxxxxxxxxx xxx Xxxxxx Xxxx . . . . . . . . . . . . . . . . . . . . . . . . . . 00

Xxxxxx Xxxxxxx
xxxx://xxx.XxxxXx.xxx/xxxxxxxxxx/xxxxxxxxxXxxx0000.xxxx (Image Placeholder) *Xxxx xx Xxxxxxxx, XX*

Frank successfully campaigned for a seat on the mayor's counsel. But he clashed with the other members, resulting in his dismissal.

He returned to running his company, Frank's Lumber Distributors, Inc.

602

⇩

Nnnnn xxxxxxxxxxxx vvvvvvvvv xxx x nnnn xx xxx nnnnn'n nnnnnnn. Xxx nn vvvvvvv xxxx xxx xxxxx nnnnnnn, vvvvvvvv xx xxx nnnnnnnnn.

Nn vvvvvvvv xx vvvvvvv xxx nnnnnnn, Eeeeee'e Eeeeee Eeeeeeeeeee, Eee.

604

(OR)

Xxxx xxxxxxxxxxxx xxxxxxxxxx xxx x xxxx xx xxx xxxxx'x xxxxxxx. Xxx xx
(N)        (V)         (N)       (N)    (N)         (N)

xxxxxxx xxxx xxx xxxxx xxxxxxx, xxxxxxxxx xx xxx xxxxxxxxx.
(V)        (N)         (V)           (N)

Xxxxxxxxxx xx xxxxxxx xxx xxxxxxx, Xxxxxx'x Xxxxxx Xxxxxxxxxxxx, Xxx.
(N)              (N)          (E)        (E)         (E)          (E)

REMOVING SENSITIVE CONTENT FROM DOCUMENTS WHILE PRESERVING THEIR USEFULNESS FOR SUBSEQUENT PROCESSING

BACKGROUND

Users are becoming increasingly intent on ensuring that their personal documents remain private. To address this issue, companies have attempted to clarify their policies with respect to the manner in which their customers' documents are retained and shared with others (if applicable). In certain cases, a company may also encrypt the documents and/or selectively sanitize certain personal information items in the documents (such as names, social security numbers, etc.). However, these techniques are not fully satisfactory for reasons set forth herein.

SUMMARY

A computer-implemented technique is described herein for removing sensitive content from documents in a manner that preserves the usefulness of the documents for subsequent analysis. For instance, the technique obscures sensitive content in the documents while retaining meaningful information in the documents for subsequent processing by a machine-implemented analysis engine, such as a machine-learning analysis engine. The technique therefore protects the privacy of users, while contributing to the development of more accurate machine-implemented analysis engines.

According to one illustrative aspect, the technique replaces original characters in the documents with one or more generic placeholder characters, while preserving the formatting and structure associated with the documents.

According to another illustrative aspect, the technique also preserves information regarding one or more properties of the sensitive content that has been obscured. For example, the technique can preserve information that identifies the grammatical characteristics associated with a string that has been obscured, the natural language with which the string is expressed, and so on.

According to another illustrative aspect, the technique removes sensitive content from documents using a modification strategy that is chosen based on one or more selection factors. One selection factor identifies the nature of the processing that is to be performed on the documents after they have been sanitized, such as the nature of machine-learning that is to be applied to the documents. The technique leverages this selection factor by choosing a modification strategy that preserves information that will be most useful in subsequent analysis performed on the anonymized documents. For example, the technique can preserve parts-of-speech information regarding the words in a document to accommodate later analysis performed by a natural language analysis engine of any type.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 5-7 show three examples of the operation of the system of FIG. 1.

Figure 1:
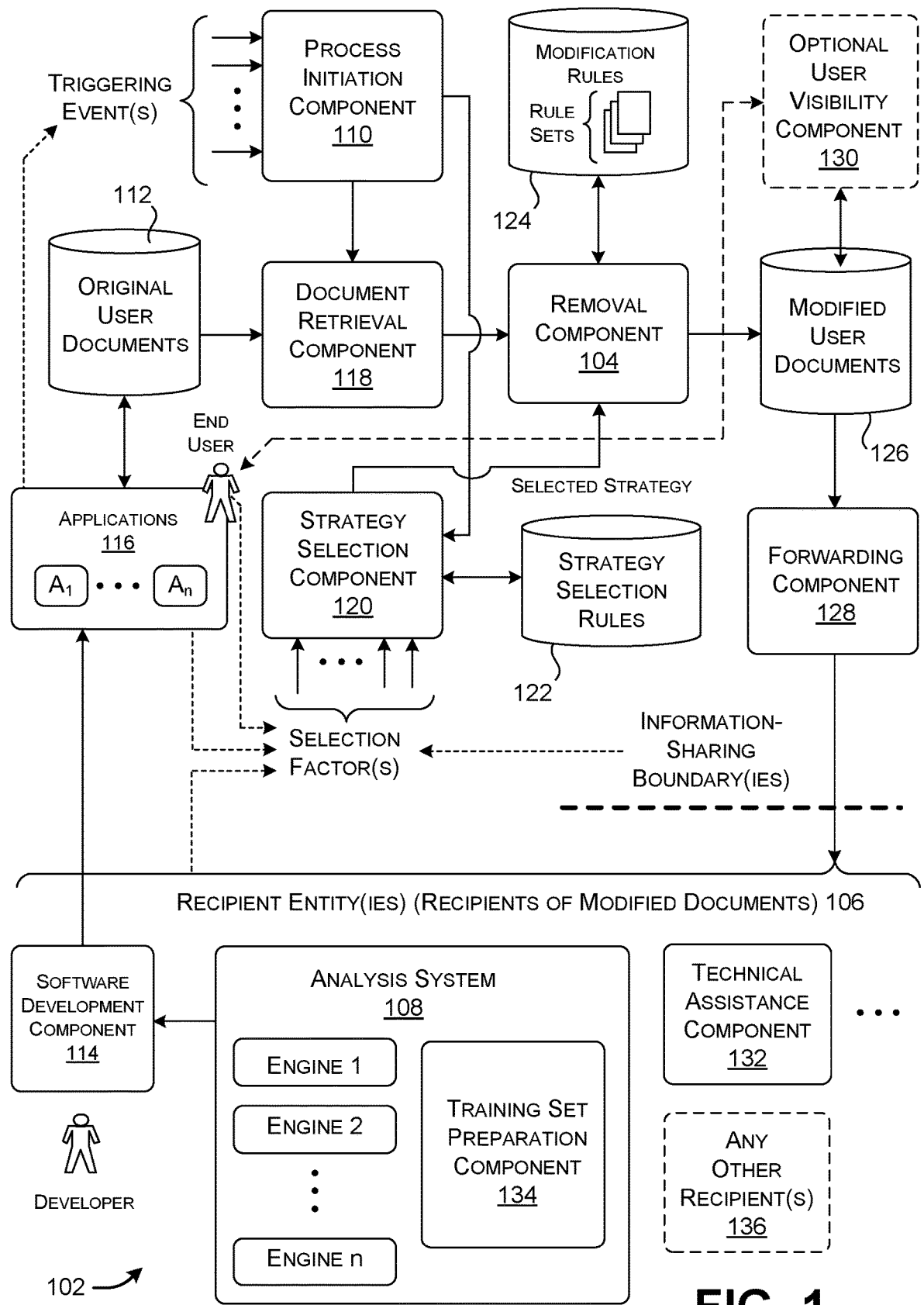
FIG. 1 shows a system for removing sensitive items from documents.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes the operation of a system for removing sensitive content from documents. Section B describes the operation of the computing device of Section A in flowchart form. And Section C describes illustrative computing functionality that can be used to implement any processing-related aspect of the features described in the preceding sections.

As a preliminary matter, some of the figures describe concepts in the context of one or more structural components, also referred to as functionality, modules, features, elements, etc. In one implementation, the various processing-related components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each processing-related operation illustrated in the flowcharts corresponds to a logic component for performing that operation. A processing-relating operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows a system 102 that removes sensitive content from one or more documents created by, or otherwise associated with, a user. A document may refer to any unit of information. For example, without limitation, a document may correspond to a text-based document produced by a word processing application, a spreadsheet document produced by a spreadsheet application, a slide deck produced by a presentation-related program, and so on. In other cases, a document may correspond to online content, such as a web page or a portion of a web page.

In one implementation, sensitive content includes all of the information-bearing content in a document that has been created by a user or is at least capable of being modified by the user. Such content is generally referred to herein as user-defined content. The user-defined content includes alphanumeric descriptive content within the body of a document, hyperlinks, file names, images, metadata, and so on. In most cases, the bulk of the user-defined content is immediately exposed to the user when the user opens the document in a hosting application. In other cases, some of the user-defined content (such as metadata) may be hidden from the user who views the document in some modes of the hosting application. For instance, the user-defined comment can include a note associated with a text-based document that is not embedded in the document's principal body of content.

In other cases, the sensitive content may include all user-defined content, with some exceptions. For example, the sensitive content can include all alphanumeric descriptive content within the body of a document, with the exception of some conventional section headings. For instance, consider a resume. The sensitive content of this document may include all of the alphanumeric descriptive content that composes the resume, with the exception of conventional headings that may appear in the resume, such as "Work Experience," "Education," "Objectives," and "Contact Information," etc., which are not anonymized. In any event, what is referred to as "sensitive information" herein encompasses much more information than what is conventionally regarded as personal identifying information (PII). PII refers to information that can be used to directly or indirectly determine the identity of a particular person, such as the person's name, address, identity number(s), etc.

Any document that has yet to be processed by the system 102 is referred to herein as an original document. The removal of the sensitive content corresponds to a process variously referred to herein as modifying, removing, scrubbing, anonymizing, or sanitizing. A document that has been processed in this manner is variously referred to as a modified, scrubbed, anonymized, or sanitized document.

At its heart, the system 102 includes a removal component 104 that replaces the sensitive content in an original document with generic placeholder information, to produce a modified document. By doing so, the system 102 obscures all or most of the user-defined content in the document. At the same time, the removal component 104 preserves the formatting and structure associated with the document. In some cases, the removal component 104 also identifies and preserves one or more properties of at least some of the sensitive content items that it obscures.

Overall, the system 102 serves at least two objectives. First, the system 102 protects the privacy of the user by removing sensitive content. In fact, the system 102 removes all (or most) of the user-defined content, not just certain fields of PII, and therefore achieves better privacy-related performance compared to those systems that only remove selected fields of PII. Second, the system 102 improves the ability of one or more recipient entities 106 to subsequently process the modified documents. For example, one recipient entity corresponds to an analysis system 108. The analysis system 108 hosts one or more computer-implemented analysis engines that operate on the modified documents to generate one or more respective models. For instance, at least some of the analysis engines may correspond to machine-learning mechanisms. The analysis engines produce more useful and accurate models by virtue of the fact that they operate on modified documents that are not completely devoid of analyzable information. This differentiates the approach from techniques which produce completely meaningless information, such as encryption techniques which produce meaningless hash codes.

With the above introduction, the system 102 of FIG. 1 will now be described in greater detail, generally proceeding from left to right in the figure. To facilitate explanation, the system 102 will be described in the context of a single set of documents associated with a single user. However, the same principles described below can be extended to a set of documents associated with more than one user, such as a set of documents associated with the employees of a company, or a set of documents associated with a group of users who interact with the same application(s) and/or who share one or more other characteristics, etc.

A process initiation component 110 initiates a process performed on one or more documents provided in one or more data stores 112 (referred to in the singular below for brevity). The process initiation component 110 determines whether to initiate the process based on one more triggering events received from one or more sources.

In a first case, the process initiation component 110 initiates the scrubbing process upon receiving an instruction to do so by the user; that instruction corresponds to one type of triggering event. In a second case, the process initiation component 110 initiates the scrubbing process upon receiving an instruction to do so by some user or entity other than the user who is associated with the documents; that instruction corresponds to another type of triggering event. For example, the process initiation component 110 can initiate the process upon receiving an instruction to do so from a system administrator.

In a third case, the process initiation component 110 initiates the scrubbing process on a periodic basis, e.g., once a day, once a week, etc. Here, the triggering event corresponds to an output signal generated by a time-keeping mechanism when a scheduled time to invoke the system 102 has arrived.

In a fourth case, the process initiation component 110 initiates the scrubbing process in response to the user's activation of a particular application, such as a representative application $A_1$. This action constitutes another triggering event. More specifically, in response to the activation of application $A_1$, the system 102 can perform the scrubbing process for a subset of the documents in the data store 112 that are associated with the application $A_1$. If authorized by the user, the analysis system 108, in cooperation with a software development component 114, leverage the resultant anonymized documents to develop new software tools for application $A_1$, or to refine existing software tools for application $A_1$. For instance, the analysis system 108, in cooperation with a software development component 114, may provide those new or updated tools in response to performing machine-learning on the modified documents. An application that is capable of participating in such a framework is referred to herein as an "enlightened" application. It is regarded as enlightened because it receives the benefit of pattern analysis performed by the analysis 108.

The motivation which underlies the fourth case is as follows. The data store 112 may store a great variety of documents associated with many different applications 116 that are available to the user. It would be time-consuming and inefficient for the system 102 to analyze all of the documents. Moreover, many of the documents may be associated with applications that are not enlightened, meaning that these applications are not capable of receiving new or updated software tools in the manner described above. The system 102 leverages the user's activation of the application $A_1$ as a way of focusing the system 102 on work that has a high potential of providing value to the user. Doing so increases its speed of the system's operation, and reduces its use of computing resources.

The above-described triggering events are described by way of illustration, not limitation. In other implementations, the process initiation component 110 can respond to other types of triggering events. In still other implementations, the process initiation component 110 can make a decision as to whether to invoke the scrubbing process based on any logical combination of separate triggering events.

When a document processing operation is invoked, a document retrieval component 118 retrieves a subset of documents from the data store 112. More specifically, the document retrieval component 118 culls a subset of documents that meets one or more characteristics. In one case, the document retrieval component 118 retrieves all documents that have yet to be anonymized since a last scrubbing operation was performed. In addition, or alternatively, the document retrieval component 118 retrieves all documents that meet prescribed characteristics, such as documents associated with one or more particular applications, and so on. The document retrieval component 118 forwards the retrieved documents(s) to the removal component 104 for processing.

A strategy selection component 120 determines a modification strategy to be applied to the documents from among a set of possible modification strategies. The chosen modification strategy determines the manner in which sensitive content in the documents is transformed into anonymized content. Each modification strategy, in turn, is defined by a set of rules. Examples of the rules will be set forth below. Generally, the term "rule" or "set of rules" is used herein to refer to any logic and/or information that can be leveraged by a computing device to carrying out a policy. For example, a "set of rules" can encompass one or more IF-THEN-structured rules, an algorithm, an equation, a machine-learned model, one or more parameter values (and/or any other information items) that control the operation of some other component, and so on.

The strategy selection component 120 determines a modification strategy based on one or more selection factors. In a first case, a selection factor specifies a preference of the user who is associated with the documents. The strategy selection component 120 chooses a modification strategy that conforms to the user's preference. For instance, different modification strategies may anonymize the documents to differing degrees. A user may specify a preference for a high level of privacy; the strategy selection component 120 responds by choosing a modification strategy that provides the desired degree of privacy.

In a second case, a selection factor specifies the jurisdiction to which the modified documents are to be sent. For example, a selection factor may specify that the modified documents are to be sent from a first country to a second country. In more complex cases, a selection factor may describe all of the information sharing boundaries through which the modified documents pass on their way to a recipient entity. For example, a selection factor may specify that documents are temporarily stored in a first jurisdiction prior to being sent to a second jurisdiction. The strategy selection component 120 leverages this type of selection factor to choose a modification strategy that is compatible with the laws and social norms associated with the identified jurisdiction(s).

In a third case, a selection factor specifies the kind of processing that is to be applied to the modified documents by a recipient entity. The strategy selection component 120 responds to this type of selection factor by choosing a modification strategy that provides the most useful information for the intended end-use of the modified documents. For example, consider a selection factor that specifies that an analysis engine will perform natural language processing on the set of modified documents. In response to this factor, the strategy selection component 120 can choose a strategy that anonymizes the documents while preserving part-of-speech information of words in the documents, such as the part-ofspeech associated with each word in the document, and/or the probabilities of certain parts-of-speech in the document as a whole.

In another example, a selection factor may specify that an analysis engine performs analysis on documents that takes account of the topical classifications of the documents, such as whether an individual document pertains to a legal topic, a medical topic, etc. For example, an analysis engine can determine the average length of documents, paragraphs, sentences, words, etc. on a domain-by-domain basis. In response to this factor, the strategy selection component 120 can choose a strategy that anonymizes the documents while preserving information that identifies the domains associated with the respective documents, e.g., by identifying the topical classifications associated with the documents. In another case, the strategy selection component 120 can choose a strategy that preserves additional domain-related metadata regarding the documents. For instance, assuming that a document pertains to a domain X (such as the legal domain), the strategy selection component 120 can choose a strategy that also identifies and stores the frequency of certain words associated with the domain X (such as "jurisdiction," "interpleader," etc.).

In a fourth case, a selection factor provides information regarding what strategies have been successful in the past, with respect to the type of processing that the recipient entity will be performing on the anonymized documents. For example, again consider the case in which an analysis engine will perform some kind of natural language processing on the anonymized documents. The system 102 can supply performance information that describes what modification strategies have yielded good results for natural language processing, and which modifications strategies have provided poor results. A modification strategy produces good results when it produces anonymized documents that contribute to the production of an accurate machine-trained model. A modification strategy produces poor results when it produces anonymized documents that contribute to the production of a relatively inaccurate machine-trained model. The accuracy of a model, in turn, can be assessed based on the percentage of output results that it generates which provide correct answers.

The above-described selection factors are described by way of illustration, not limitation. In other implementations, the strategy selection component 120 can take into consideration a different set of selection factors.

In some cases, one or more users manually supply at least some of the selection factors. Alternatively, or in addition, the system 102 can automatically supply at least some of the selection factors. For example, consider the case in which an end-user begins interacting with a word processing application to create a document. Further assume that one or more analysis engines have been developed that perform natural language processing on documents created by users. In this situation, the user's act of invoking the application causes the system 102 to send an event signal to the strategy selection component 120, where that event signal constitutes a selection factor that informs the strategy selection component 120 that the user is using a particular kind of application. The strategy selection component 120 then uses its logic to map that selection factor into a modification strategy that operates to preserve (for instance) some grammatical and/or semantic information associated with the user's documents.

The strategy selection component 120 itself can be implemented in different ways. In one approach, the strategy selection component 120 corresponds to a lookup table. The lookup table maps a set of selection factors to an output result that specifies a most favorable modification strategy. In another approach, the strategy selection component 120 can make the decision using a machine-trained model or rules-based engine. A data store 122 stores the lookup table or model.

The removal component 104 anonymizes the documents based on the modification strategy that has been selected by the strategy selection component 120. The selected modification strategy is associated with a set of rules provided in a data store 124. The rules govern the manner that the removal component 104 processes different information items in the documents. Examples of different rules will be set forth below in the description of FIGS. 5-8.

As part of the scrubbing operation, the removal component 104 can optionally perform analysis on the information items in the documents. For example, the removal component 104 can identify the part-of-speech of each word in a document, and/or the probabilities of certain parts-of-speech in the document as a whole, or the topic associated with a document as a whole (or part of the document), and so on. The removal component 104 preserves at least some of the identified properties of a document, while otherwise removing the document's sensitive content. The examples provided below will clarify this aspect of the operation of the removal component 104.

A data store 126 stores the modified documents produced by the removal component 104. A forwarding component 128 sends the modified documents to one or more of the recipient entities 106. In some cases, the forwarding component 128 can forward the modified documents across one or more information-sharing boundaries, e.g., corresponding to one or jurisdictions (states, provinces, countries, company boundaries, etc.) that may have different laws regarding data privacy.

An optional user visibility component 130 shows the user an example of the results of the anonymizing process prior to the transfer of the modified documents to the recipient entity(ies) 106. For example, consider the example in which the user has encountered some difficulty in creating a document. The user can send an anonymized document to a technical assistance component 132, whereupon the technical assistance component 132 diagnoses the user's difficulty. The technical assistance component 132 can correspond to a fully automatic engine, a semi-automatic service, or a completely manual service. Prior to sending the anonymized document to the technical assistance component, the user can request the user visibility component 130 to display the anonymized document for the user's inspection. If the user is satisfied with the level of obscuration, he or she may proceed by forwarding the anonymized document to the technical assistance component 132. If not satisfied, the user can select a more stringent modification strategy by interacting with the strategy selection component 120. Or the user may choose to abandon the task of sending the anonymized document to the technical assistance component 130. In other cases, the user can interact with the user visibility component 130 to determine the kinds of anonymized documents that are being sent to the recipient entity(ies) 106 on an ongoing basis, e.g., a periodic or event-driven basis. If the user is dissatisfied with this practice, the user can make a change to appropriate configuration settings to discontinue the transfer of anonymized documents to the recipient entity(ies) 106.

Now referring to the recipient entity(ies) 106 in greater detail, the analysis system 108 can include a preparation component 134 which optionally transforms the modified documents into a form that is suitable for processing by one or more analysis engines. For example, the preparation component 134 can generate a canonical version of each modified document that enumerates the features of the document in a consistent manner. The collection of features constitutes a vector representation of the document.

Each analysis engine can perform any type of analysis. For example, any engine can apply any type of machine-learning process on the set of modified documents. The machine-learning process can correspond to, without limitation, any of: a regression technique (such as a logistic regression technique); a support vector machine technique; a decision tree technique; a clustering technique; a neural network technique; a Bayesian network technique; and so on. In other cases, any analysis engine can apply rules-based processing, etc.

From a higher-level standpoint, some analysis engines can perform pattern matching to determine patterns in the user's actions. For example, an analysis engine can determine temporal patterns in the user's actions, such as indication that a user who performs document choice X also makes document choice Y. Alternatively, or in addition, an analysis engine can determine common content-related patterns in documents created by the users, which the system 102 can leverage to create templates.

The software development component 114 develops software tools on the basis of one or more models developed by the analysis system 108. In one approach, the software development component 114 operates in a wholly automatic manner. For example, assume that the analysis system 108 generates a model that predicts that a user performs action B immediately after the user performs action A. For example, the software development tool can predict that the user chooses a font XYZ when the user opts to create a particular kind of table ABC. The software development component 114 can develop a tool which includes a detection component that detects when the user has performed action A. The software tool also includes a user interface feature that offers the user an invitation to perform action B when it detects that the user performs action A. For example, the software tool can include a pop-up prompt that appears in the heading portion of a user interface presentation; that prompt invites the user to choose font XYZ when the user provides an instruction to create a table ABC. In other cases, the software development tool operates in a semi-automated manner, under the supervision of a software developer. In other cases, a software developer manually drives all aspects of the development process based on the output results generated by the analysis system 108. In other examples, the software development component 114 can develop templates on the basis of common content found in the user's documents. An analysis engine can identify the common content, for instance, using cluster analysis.

The above-described types of recipient entity(ies) 106 are cited by way of example, not limitation. As noted by element 136 in FIG. 1, the system 102 can provide modified documents for consumption by any other type(s) of automated, semi-automated, or manual processes.

Figure 2:
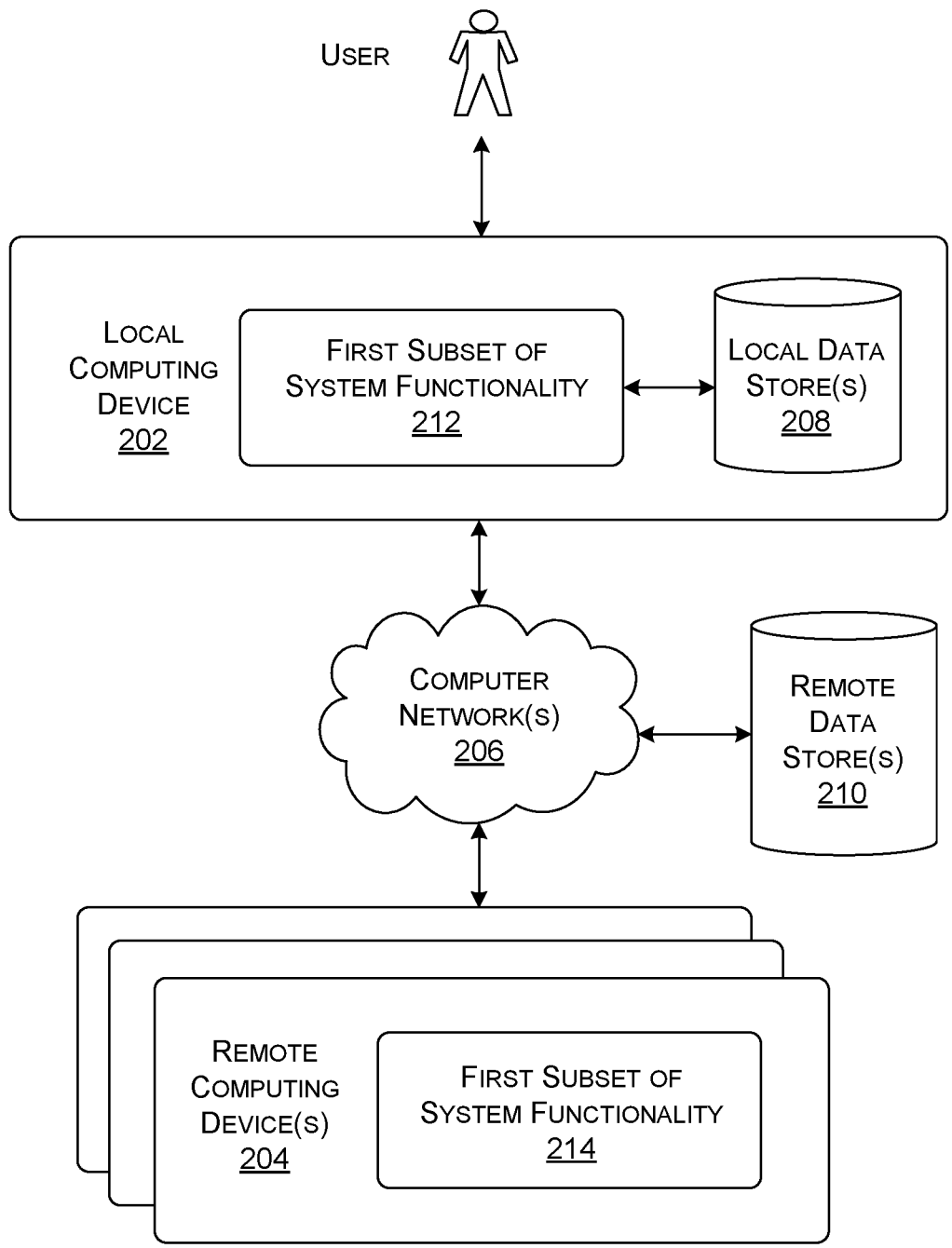
FIG. 2 shows computing equipment for implementing the system of FIG. 1.

FIG. 2 shows computing equipment for implementing the system of FIG. 1. The computing equipment includes a local computing device 202 with which the user interacts with the applications 116, and one or more optional remote computing devices 204. The local computing device 202 may correspond any of: a desktop computing device, a laptop computing device, a handheld computing device of any type (e.g., a smartphone, a tablet-type computing device, etc.), a game console device, a virtual reality device, a set-top box device, a wearable computing device, etc. The remote computing device(s) 204 may correspond to one or more servers. One or more computer networks 206 couple the local computing device 202 to the remote computing device(s) 204. The computer network(s) 206 can correspond to any type of local area network, a wide area network (e.g., the Internet), one or more point-to-point links, etc., or any combination thereof. The computing equipment also includes one or more local data stores 208 that are co-located with the local computing device 202, and one more remote data stores 210 that are provided at a remote location or locations with respect to the local computing device 202.

The various components shown in FIG. 1 can be distributed among the local computing device 202 and the remote computing device(s) 204 in any manner. FIG. 2 illustrates this point by generally indicating that the local computing device 202 includes a first subset of system functionality 212 and the remote computing device(s) 204 includes a second subset of system functionality 214.

In one case, the first subset of system functionality 212 implements all of the components of FIG. 1. In another case, the remote second subset of system functionality 214 implements all of the components of FIG. 1; in that case, the user uses the local computing device 202 to interact with the second subset of system functionality 214. In another case, the first subset of system functionality 212 and the second subset of system functionality 214 implement the components of FIG. 1 in a distributed manner. For instance, in one case, the first subset of system functionality 212 implements the applications 116, or at least part of the application functionality associated with the applications 116. The second subset of system functionality 214 implements the other components shown in FIG. 1. For instance, the second subset of system functionality 214 represents cloud-based services available to the user who is running applications 116 on his or her local computing device 202.

More specifically, in one case, the collection of components shown in FIG. 1 that contribute to the document scrubbing process are implemented by a first remote system, while the recipient entity(ies), which operate on the anonymized documents, are implemented by a second remote system. In another case, all such components are implemented by a single remote system.

Figure 3:
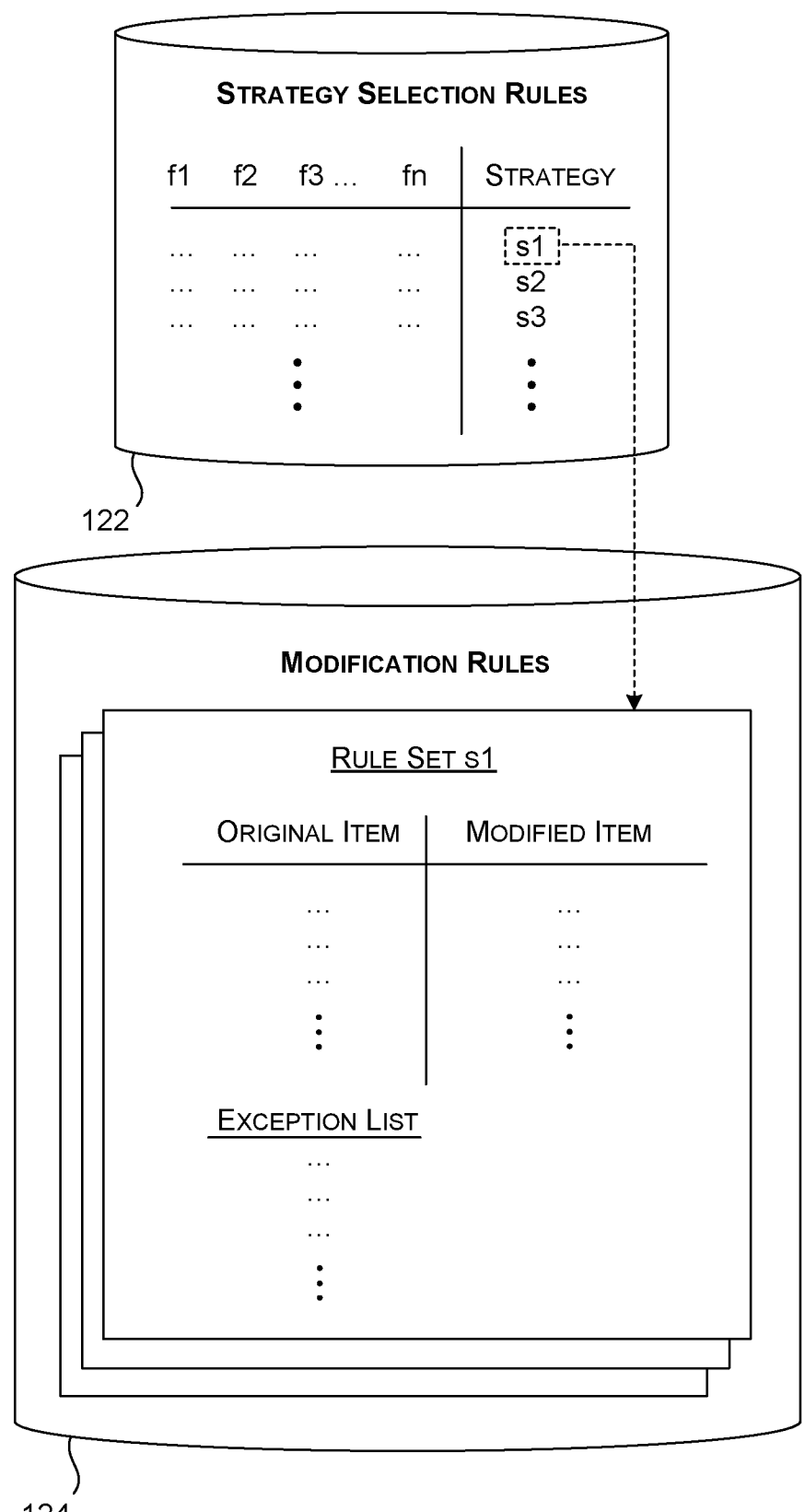
FIG. 3 shows a data store that stores a set of modification strategies, and a data store that stores two or more sets of modification rules, for use in conjunction with the system of FIG. 1.

FIG. 3 shows the data store 122 that identifies a set of strategy selection rules. Each strategy selection rule specifies a modification strategy, together with a set of invoking conditions associated with the strategy. FIG. 3 also shows the data store 124 that stores two or more sets of modification rules. Each set of modification rules is associated with a modification strategy, and describes the manner in which an original document is transformed into a modified document. As noted above, the terms "rule" and "set of rules" is to be read expansively to encompass any control information that can be leveraged by a computing device to carry out a policy.

In one implementation, the data store 122 corresponds to a lookup table. Each entry in the lookup table corresponds to a strategy selection rule that maps a set of selection factors ($f_1, f_2, \ldots, f_n$) to a modification strategy (e.g., $s_1$) that is appropriate given the selection factors. In operation, the strategy selection component 120 receives a collection of selection factors, and uses that collection selection factors as a lookup key to find the modification strategy that is most appropriate given those selection factors. More precisely, what is referred to as a selection factor in this context corresponds to a selection factor variable (such as "jurisdiction") together with a selection factor value (such as "USA").

In another implementation, the data store 122 provides a set of discrete or interconnected rules for use in selecting a modification strategy. For instance, those rules can be formulated as "IF-THEN" type rules. Alternatively, or in addition, the data store 122 may provide a machine-trained model that maps a set of selection factors into an indication of a modification strategy. Alternatively, or in addition, the data store 122 may store parameter values which control the operation of the strategy selection component 120.

In one implementation, the data store 124 stores a plurality of sets of modification rules. Each such set of rules defines a modification strategy for transforming an original document into a modified document. For example, FIG. 1 provides a high-level representation of a set of modification rules for use in implementing a first modification strategy $S_1$. In one implementation, each set of modification rules can include a mapping table. That mapping table specifies a list of original information items that may or may not appear in any given original document. The mapping table specifies how these original information items are to be transformed into respective modified information items.

For example, an illustrative mapping table may indicate that: (a) all uppercase letter characters in an original document are to be transformed into the generic placeholder character "X"; (b) all lowercase letter characters are to be transformed into the generic placeholder character "x"; and (c) all numeric characters are to be transformed into the placeholder character "0," and so on. In another example, an illustrative mapping table can vary the above table by stating that: (a) all uppercase letter characters that are part of a noun string are to be transformed into the generic placeholder character "N"; (b) all lowercase letter characters that are part of a noun string are to be transformed into the generic placeholder character "n"; (c) all uppercase letter characters that are part of a verb string are to be transformed into the generic placeholder character "V"; and (d) all lowercase letter characters that are part of a verb string are to be transformed into the generic placeholder character "v," and so on.

Alternatively, or in addition, a mapping table can indicate that all characters are to be transformed into the either "X" or "x," as in the first example. In addition, the mapping table can specify that the removal component 104 is to annotate each string in a modified document with supplemental metadata, e.g., by tagging a noun string with "N" and "n," and a verb string with "V" and "v." This kind of mapping table conveys the same property information as the previously-described case, without using different placeholder replacement characters.

Alternatively, or in addition, the removal component 104 can generate high-level information regarding an original document or portion thereof, and then append metadata that describes that high-level information to the associated modified document. For instance, that high-level information can describe grammatical and/or semantic characteristics of the original document or portion thereof, e.g., in the form of one or more statistical parameter values.

Each set of modification rules can optionally include an exception list. The exception list specifies characters or strings that are to be exempted from the rules in the mapping table. For example, the mapping table may specify that all capital letters and lowercase letters are to be replaced with the characters "X" and "x," respectively. But the exception list may indicate that the phase "Work Experience," is to be exempt from that transformation. Hence, the phrase "Work Experience" will appear in the modified document in unmodified form.

Yet other implementations can provide modification logic in other ways. For example, another implementation can include a set of conditional modification rules, e.g., structured as "IF-THEN" type rules, or rules having any other logical structure. To cite one example, a set of modification rules can specify that the phrase "Work Experience" is to be left unmodified, but only if that phrase appears in a document that has been classified as a resume. Alternatively, or in addition, the data store 124 can store parameter values that determine the operation of the removal component 104.

Figure 4:
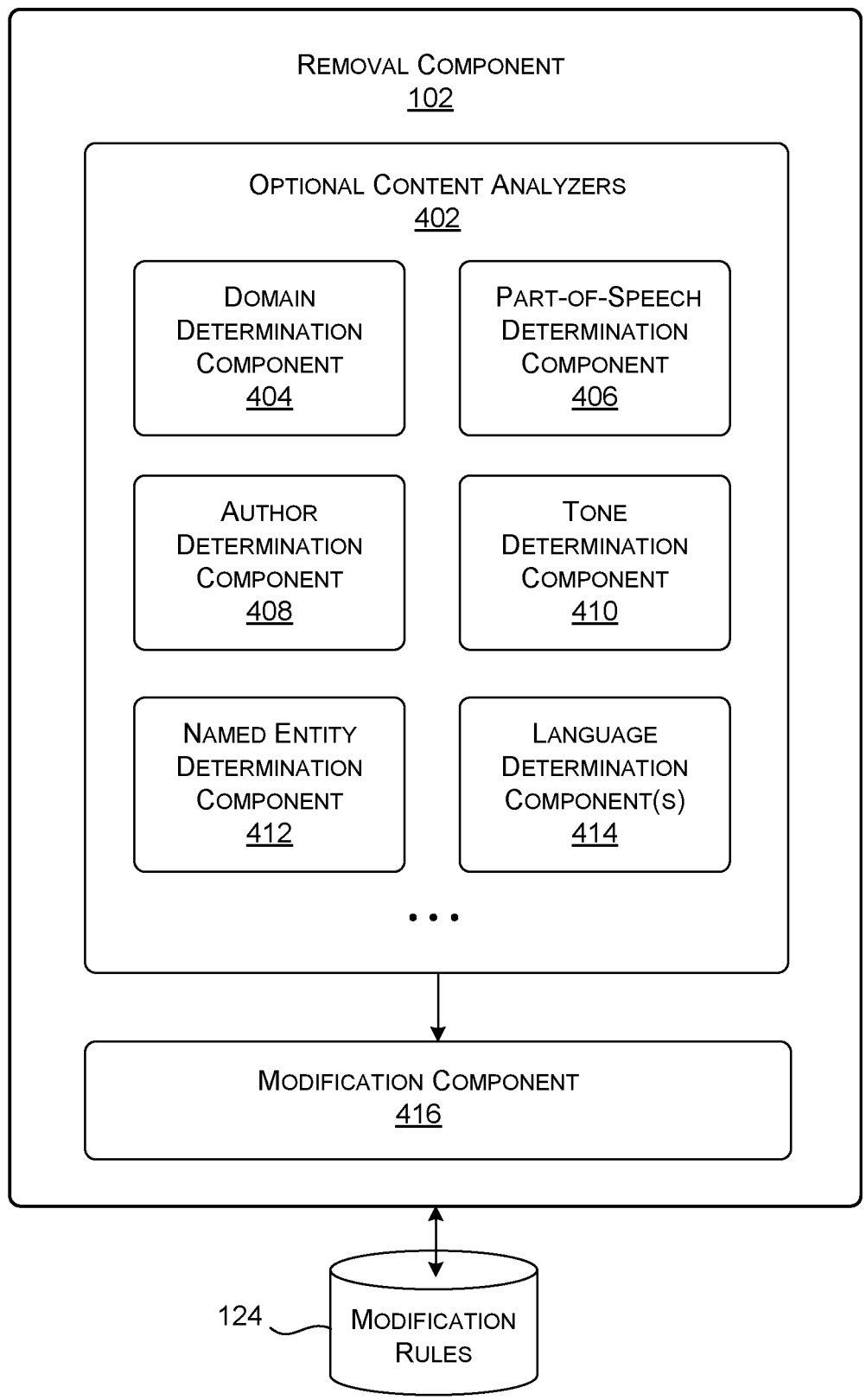
FIG. 4 shows one implementation of a removal component, which is an element of the system of FIG. 1.

FIG. 4 shows one implementation of a removal component 104, which is an element of the system of FIG. 1. The removal component 104 can optionally include a set of content analyzers 402. Each content analyzer classifies some part of an original document, including the original document as a whole, a paragraph of the original document, a sentence of the original document, a word in the original document, a character in the original document, etc.

For example, a domain determination component 404 determines the topic of the original document as a whole (also referred to herein as the document's genre, domain, etc.). A part-of-speech determination component 406 determines a part-of-speech of each string in the original document. An author determination component 408 determines the contributions made by plural authors in creating an original document, in those cases in which there is evidence that the document has been created by two or more authors. A tone determination component 410 identifies the tone or style associated with each part of the original document. For example, the tone determination component 410 can identify whether each part of the original document expresses a passive or active voice. Alternatively, or in addition, the tone determination component 410 can identify whether each part of the original document expresses a positive or negative sentiment, etc. A named entity determination component 412 determines whether each string in the original document corresponds to a named entity. (A named entity corresponds to a particular person, place, organization, thing, etc., typically associated with a proper noun.) A language determination component 414 determines the natural language associated with each string in the original document, and so on.

The above-identified list of content analyzers is cited by way of example, not limitation; other implementations can use a different subset of content analyzers, or no content analyzers. For instance, without limitation, other implementations can include: content analyzers that identify the presence of key terms (words, phrases, etc.) in documents; content analyzers that generate high-level summaries of documents (wherein that analysis can be performed, for instance, by a rules-based engine, a deep neural network, etc.); content analyzers that assess reading level and/or reading time associated with the documents (wherein that analysis can be performed, by instance, by a linear classifier, a deep neural network, etc.), and so on.

More generally, a subset of the content analyzers can perform analysis directed to the grammatical structure of text. This class of analyzers includes the part-of-speech determination component 406. Another subset of content analyzers can perform analysis based on the semantic dimension of text. This class of analyzers includes the domain determination component 404, the tone determination component 410, the named entity determination component 412, etc. Another subset of content analyzers can determine some meta-level property of the text, where such classification does not necessarily depend on the meaning of a particular passage of text. This class of analyzers includes the author determination component 408 and the language determination component 414, etc.

Each content analyzer can be implemented in any manner, such as a machine-trained model, a rules-based system, etc., or any combination thereof. To cite one example, the part-of-speech determination component can be implemented by a machine-trained conditional random fields (CRFs) model. The domain determination component 404 and tone determination component 410 can be implemented by a machine-trained classification component, such as a linear classification model, a neural network model, a decision tree model, etc. The named entity determination component 412 can be implemented by consulting a dictionary which indicates whether a string under consideration corresponds to a named entity, and/or by using a machine-trained classification model of any type. The language determination component 414 can similarly be implemented as a lookup table and/or a machine-trained classification model of any type. The author determination component 408 can be implemented by a rules-based system which extracts existing metadata from the original document that identifies the author(s) associated with different passages within an original document, and/or by using a machine-trained classification model of any type.

A modification component 416 carries out the modification rules associated with a selected modification strategy. The modification component 416 also leverages the output results of the content analyzers 402. For example, in accordance with an illustrative rule, the modification component 416 can replace the word "Dog" with "Nnn," based on an indication from the part-of-speech determination component 406 that the word "dog" is a noun.

Figure 7:

FIGS. 5-7 show three examples of the operation of the system 102 of FIG. 1. Beginning with FIG. 5, this figure shows a portion of an original document 502 and a portion of a corresponding modified document 504. In accordance with a particular selected modification strategy $S_1$, the system 102 operates to: (a) replace all uppercase letter characters with "X"; (b) replace all lowercase letter characters with "x"; and (c) replace all numeric characters with "0." Although not shown, the system 102 performs this same substitution for all metadata associated with the document, and the file name itself. The system 102 also replaces each image with a generic placeholder image having the same size, position and resolution as the original image. The system 102 also anonymizes the text associated with each hypertext link, as well as the address associated with the hypertext link.

Note, however, that the system 102 preserves all of the formatting and structure associated with the original document 502. This dimension of the original document includes the arrangement of text in the original document 502, the formatting applied to the text in the original document 502 (including boldface, underlining, italics, text color, etc.), the fonts associated with the original text in the original document 502, the table structure of the original document 502 (not shown in this particular example), and so on.

In an alternative example (not shown), the system 102 can refrain from modifying one or more phrases in the original document 502, based on the inclusion of these phrases in an exception list. For example, the system 102 could refrain from anonymizing the phrase "Table of Content." The reasoning behind this manner of operation is that this phase is generic in nature. It is therefore helpful to retain this phrase in the modified document to better convey the document's characteristics, while still protecting truly sensitive content associated with the original document 502.

In the second example, FIG. 6 shows a portion of an original document 602 and a portion of a corresponding modified document 604, produced by applying a second modification strategy $s_2$. In this case, the system 102 applies the same modification rules described above with reference to FIG. 5, e.g., by replacing letter characters with "X" and "x." In addition, the system 102 in FIG. 6 operates to: (a) replace all uppercase letter characters in a noun string with "N"; (b) replace all lowercase letter characters in a noun string with "n"; (c) replace all uppercase letter characters in a verb phrase with "V"; (d) replace all lowercase letter characters in a verb phrase with "v"; (e) replace all uppercase letter characters in a named entity with "E"; and (f) replace all lowercase letter characters in a named entity with "e," and so on. The system 102 also applies these rules in a hierarchy. For example, the system 102 will label a string as a named entity rather than a noun, even though the named entity is also a noun.

FIG. 6 also shows an alternative manner of expressing metadata, as indicated in an alternative portion of the modified document 606, corresponding to another modification strategy $s_2'$ (representing a variation of the strategy $s_2$). Here, the system 102 adopts the modification rules shown in FIG. 5 by replacing strings with "X" or "x." In addition, the system 102 annotates strings with supplemental metadata that indicates whether they correspond to noun phrases, verb phrases, or named entities. The system 102 can expand the mode of operation shown in FIG. 6 to identify and preserve additional metadata items, such as metadata that describes: other parts-of-speech (in addition to nouns and verbs); higher-level summary information associated with the original document 602 or portion thereof (such as statistical information pertaining to the grammatical and/or semantic characteristics of the original document 602, etc.); the tone, active/passive voice, etc. associated with each part of the original document 602, etc.

In the third example, FIG. 7 shows a portion of an original document 702 and a portion of a corresponding modified document 704, produced by applying a third modification strategy $s_3$. In this case, the system 102 applies the same modification rules described above with reference to FIG. 5, e.g., by replacing letter characters with "X" and "x." But the system 102 does not anonymize certain terms/phrases, such as "estate," "per stripes," "will," "personal property," etc. The system 102 refrains from anonymizing these terms/phrases because they appear in an exclusion list. Or the system 102 may refrain from modifying these terms/phrases because: (1) the document as a whole has been assessed as pertaining to a legal document; and (2) the terms/phrases appear in an exception list. This means that the system 102 would anonymize these terms/phrases if they appeared in any document other than a legal document. Alternatively, or in addition, system 102 may refrain from modifying certain terms/phrases when: (1) the terms/phrases appear in certain parts of a document (such as headings); and (2) the terms/phrases appear in an exception list. This means that the system 102 would anonymize certain terms/phrases depending on whether they appeared in certain contexts within the document.

In addition, note that the original document 702 is written by a first author, but includes a comment 706 by a second author. Further note that the second author writes the comment 706 in the Spanish language. According to one illustrative modification rule, the system 102 replaces the Spanish language text with special generic placeholder characters ("F" and "f," for instance), to indicate that these strings correspond to a foreign language, or that these strings specifically pertain to the Spanish language. This example makes the non-limiting assumption that the default natural language is English.

FIG. 7 also shows an alternative manner of capturing metadata associated with a modification strategy $s_3'$, as indicated in an alternative portion of the modified document 708. Here, the system 102 adopts the modification rules shown in FIG. 5 by replacing letter characters with "X" or "x." In addition, the system 102 annotates strings with supplemental metadata that identifies the author associated with each string, the foreign language associated with each string, etc. Also note that the system 102 in this case does not leave any strings non-obscured. But the system 102 does associate metadata with the modified document 708 as a whole that indicates that it likely pertains to a legal document, as evidenced by the tag with the label "topic=L." Alternatively, the system 102 could have tagged individual terms in the modified document 102 to indicate that they are legal phrases.

FIG. 7 also generally illustrates the point that different modification rules may afford different levels of privacy. In the modified document 704, a reader could potentially extract meaningful private information from the partially anonymized text. For example, the reader could reasonably infer that the modified document 704 is a will, and that the will bequeaths property to a list of recipients in the manner of per stirpes. The reader could also deduce the identities of the recipients (and individuals who might be excluded) based on the number of characters in each presumed name, together with some a priori knowledge regarding who might be named. For this reason, a user may wish to utilize the anonymizing strategy used in the modified document 708, which affords a greater level of privacy.

In conclusion to Section A, consider the following end-to-end example. Assume that an application provides a word processing experience, and that the user, in the course of his or her work, is in the habit of writing memos to subordinates regarding monthly performance goals. The memos tend to follow a pattern and include repeated language. To create a memo, the user often resorts to cutting and pasting from previous memos.

In a first stage, the process initiation component 110 determines that the user has activated the word processing application to create a new monthly performance memo. The activation of the word processing application operates as a trigger which initiates the scrubbing operation performed by the system 102. In response, the document retrieval component 118 retrieves a subset of documents created by the user (or a related group of users) over the last year, or some other period of time.

The strategy selection component 120 chooses a modification strategy based on a combination of selection factors. One selection factor indicates that a set of natural language-based machine-learning analysis engines have been developed to process documents produced by the particular word processing application that the user is using. Another selection factor indicates that forwarding anonymized documents to the analysis engines would not involve sending documents outside of the user's current information-sharing jurisdiction. In view of these factors, assume that the strategy selection component 120 chooses the kind of modification strategy shown in FIG. 6. That strategy marks nouns, verbs, and named entities in the documents, while removing sensitive content. Like all modification strategies, it also preserves the formatting and structure of the documents.

The removal component 104 anonymizes the user's documents based on the selected modification strategy. The forwarding component 128 forwards the anonymized documents to one or more machine-learning analysis engines. Assume that one analysis engine detects the following pattern in the user's memo-creating practice. First, the analysis engine determines that the user commonly draws from a set of reusable paragraphs when drafting memos, but not when creating other kinds of documents. Second, the analysis engine determines the user's memos often include telltale structural patterns and grammatical patterns. In response to these findings, the software development component 114 develops a software tool which analyzes the documents that the user is creating in real time. When it detects that the user is creating a memo (based on the appearance of the telltale grammatical and/or structural patterns in the user's writing), it offers the user a popup invitation to access the set of commonly reused paragraphs. The software development component 114 offers that software tool to the user the next time that the user interacts with the particular word processing application. The user can agree to the invitation, upon which the software development component 114 downloads to the software tool to the user's local computing device, or otherwise makes the software tool available to the user.

The system 102 achieves at least two objectives in this example. First, it anonymizes the documents to protect the privacy of the user who created the documents. Second, it preserves information that ultimately enables the software development component 114 to generate an accurate machine-generated model for use by the user, such as a machine-learned model, or a rules-based mechanism, etc. The system 102 furthermore achieves these objectives through a general-purpose technical framework that handles the complex decision-making involved in processing user documents. An organization can leverage the framework to achieve the dual goals mentioned above in an accurate, time-efficient, and resource-efficient manner, e.g., by eliminating or reducing reliance on an ad hoc, case-by-case, and error-prone handling of privacy-related issues.

B. Illustrative Process

Figure 8:
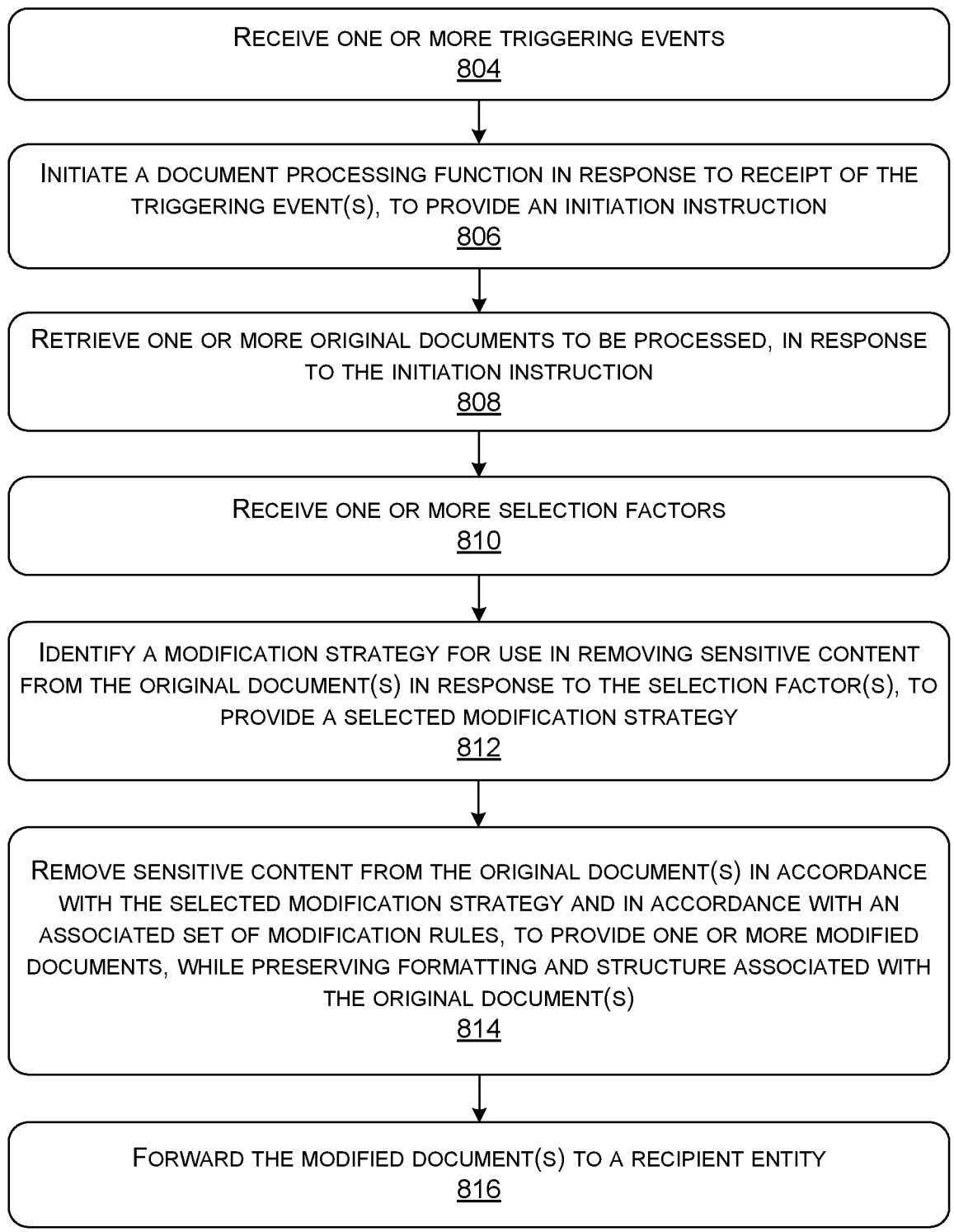
FIG. 8 is a flowchart that describes one manner of operation of the system of FIG. 1.

FIG. 8 shows a process 802 that explains the operation of the system 102 of Section A in flowchart form. Since the principles underlying the operation of the system 102 have already been described in Section A, certain operations will be addressed in summary fashion in this section. As noted in the prefatory part of the Detailed Description, the process 802 is expressed as a series of operations performed in a particular order. But the order of these operations is merely representative, and can be varied in any manner.

In block 804, the system 102 receives one or more triggering events. In block 806, the system 102 initiates a document processing function in response to receipt of the triggering event(s), to provide an initiation instruction. In block 808, the system 102 retrieves one or more original documents to be processed from a data store in response to the initiation instruction. In block 810, the system 102 (optionally) receives one or more selection factors. In block 812, the system 814 (optionally) identifies a modification strategy for use in removing sensitive content from the original document(s) in response to the selection factor(s), to provide a selected modification strategy. In block 814, the system 102 removes sensitive content from the original document(s) in accordance with the selected modification strategy and in accordance with an associated set of modification rules, to provide one or more modified documents, while preserving formatting and structure associated with the more original document(s). In block 816, the system 102 forwards the modified document(s) to a recipient entity, such as a computing mechanism that performs machine-learning on the basis of the modified document(s). In one implementation, at least one of the selection factors describes a characteristic of processing performed by the recipient entity.

C. Representative Computing Functionality

Figure 9:
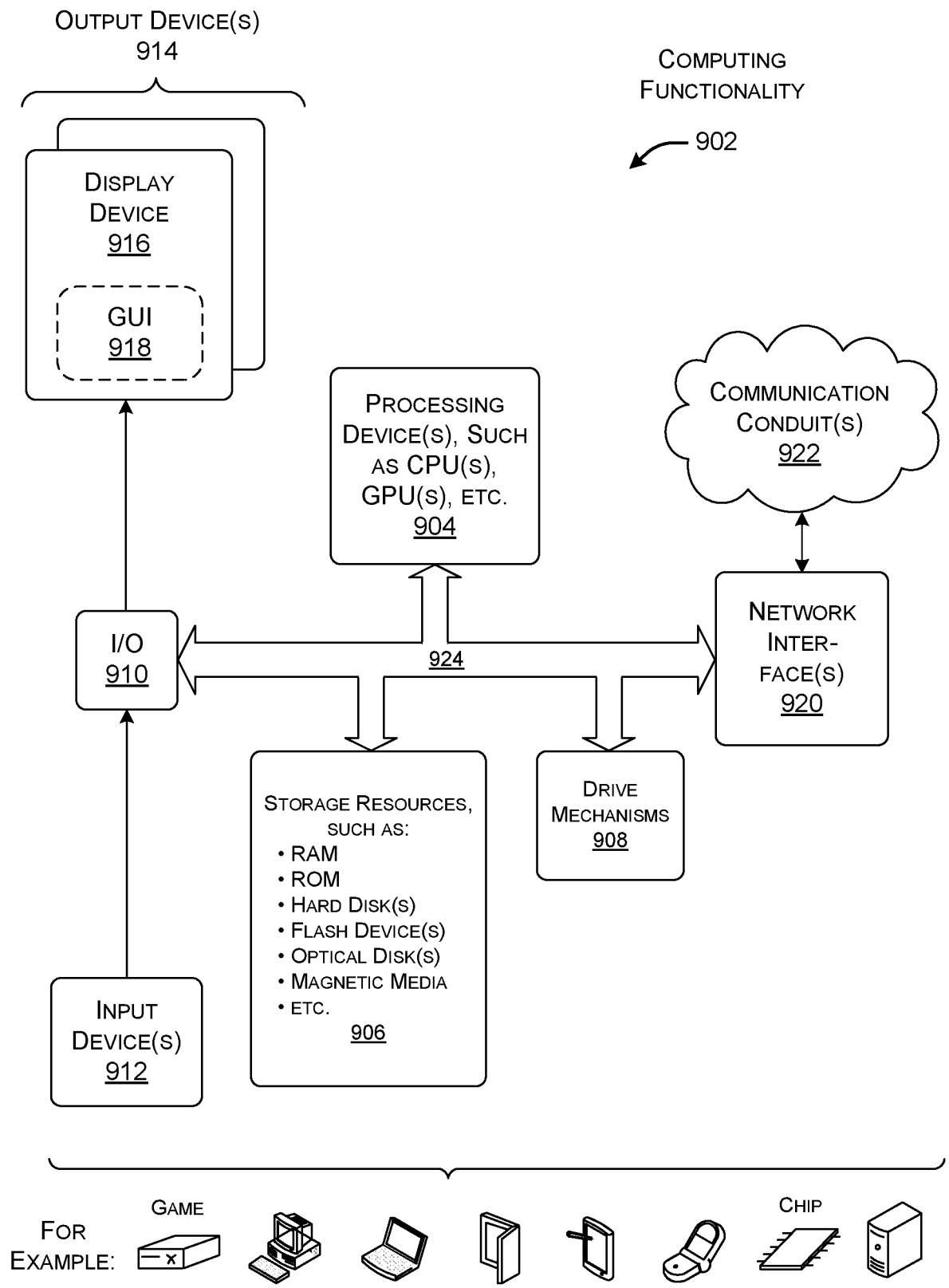
FIG. 9 shows illustrative computing functionality that can be used to implement any aspect of the features shown in the foregoing drawings.

FIG. 9 shows computing functionality 902 that can be used to implement any aspect of the mechanisms set forth in the above-described figures. For instance, the type of computing functionality 902 shown in FIG. 9 can be used to implement the local user computing device 202 shown in FIG. 2, and/or any remote computing devices 204 shown in FIG. 2. In all cases, the computing functionality 902 represents one or more physical and tangible processing mechanisms.

The computing functionality 902 can include one or more hardware processor devices 904, such as one or more central processing units (CPUs), and/or one or more graphics processing units (GPUs), and so on. The computing functionality 902 can also include any storage resources (also referred to as computer-readable storage media or computer-readable storage medium devices) 906 for storing any kind of information, such as machine-readable instructions, settings, data, etc. Without limitation, for instance, the storage resources 906 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 902. The computing functionality 902 may perform any of the functions described above when the hardware processor device(s) 904 carry out computer-readable instructions stored in any storage resource or combination of storage resources. For instance, the computing functionality 902 may carry out computer-readable instructions to perform each block of the process 802 described in Section B. The computing functionality 902 also includes one or more drive mechanisms 908 for interacting with any storage resource, such as a hard disk drive mechanism, an optical disk drive mechanism, and so on.

The computing functionality 902 also includes an input/output component 910 for receiving various inputs (via input devices 912), and for providing various outputs (via output devices 914). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 916 and an associated graphical user interface presentation (GUI) 918. The display device 916 may correspond to a liquid crystal display device, a light-emitting diode display device, a cathode ray tube device, a projection mechanism, etc. Other output devices include a printer, one or more speakers, a haptic output mechanism, an archival mechanism (for storing output information), and so on. The computing functionality 902 can also include one or more network interfaces 920 for exchanging data with other devices via one or more communication conduits 922. One or more communication buses 924 communicatively couple the above-described components together.

The communication conduit(s) 922 can be implemented in any manner, e.g., by a local area computer network, a wide area computer network (e.g., the Internet), point-to-point connections, etc., or any combination thereof. The communication conduit(s) 922 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 902 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, one or more computing devices for removing sensitive content from documents are described. The computing device(s) include: a data store for storing one more original documents; a process initiation component configured to initiate a document processing function in response to receipt of one or more triggering events, to provide an initiation instruction; a document retrieval component configured to retrieve one or more original documents to be processed from the data store in response to the initiation instruction; a strategy selection component configured to identify a strategy for use in removing sensitive content from the original document(s) in response to one or more selection factors, to provide a selected modification strategy; a removal component configured to remove sensitive content from the original document(s) in accordance with the selected modification strategy and in accordance with an associated set of modification rules, to provide one or more modified documents; and a forwarding component configured to forward the modified document(s) to a recipient entity over a communication conduit. The removal component is configured to remove the sensitive content from the original document(s), while preserving formatting and structure associated with the original document(s). Further, at least one of the selection factors describes a characteristic of processing to be performed by the recipient entity.

According to a second aspect, one triggering event corresponds to an activation, by a user, of a particular application. Further, the original document(s) are associated with the particular application. Further, the recipient entity corresponds to a computing mechanism that performs machine-implemented analysis on a basis of the modified document(s), to provide a model for use in conjunction with the particular application.

According to a third aspect, the recipient entity is a computing mechanism that performs machine-implemented analysis on a basis of the modified document(s). The selection factor mentioned in the first aspect describes a characteristic of processing performed by the machine-implemented analysis.

According to a fourth aspect, another selection factor describes a privacy requirement of a jurisdiction associated with the recipient entity.

According to a fifth aspect, another selection factor describes a preference of a user who is associated with the original document(s).

According to a sixth aspect, the set of modification rules provides an instruction to: identify an original character in a string in an original document; and replace the original character with a predetermined generic placeholder character, while preserving information regarding a property of the original character and/or the string in which the original character appears.

According to a seventh aspect (depending on the sixth aspect), the generic placeholder character is selected from a set of two or more possible generic placeholder characters, and the preserving operation is performed by a choice of the generic placeholder character from among the set.

According to an eighth aspect (depending on the sixth aspect), the preserving operation is performed by associating supplemental metadata with the generic placeholder character, the supplemental metadata conveying the property.

According to a ninth aspect (depending on the sixth aspect), the removal component includes a content analyzer component configured to perform analysis on text in the original document(s) to identify the property.

According to a tenth aspect (depending on the sixth aspect), the removal component is configured to identify each property in a set of properties that apply to the original character and/or the string in which the original character appears. The set of properties includes: a first property that indicates whether the original character is an uppercase alphabetical character; a second property that indicates whether the original character is a lowercase alphabetical character; and a third property that indicates whether the original character is a numeric character.

According to an eleventh aspect, the set of properties also includes a property that specifies a grammatical characteristic associated with the string.

According to a twelfth aspect, the set of properties also includes a property that specifies a natural language associated with the original character and/or the string.

According to a thirteenth aspect, the set of properties also includes a property that specifies a semantic characteristic associated with the string.

According to a fourteenth aspect, the set of modification rules specifies a set of strings that are exempt from one or more other rules in the set of modification rules.

According to a fifteenth aspect, the set of modification rules further provides an instruction to generate and preserve metadata that describes at least one characteristic of an original document as a whole, or portion thereof.

According to a sixteenth aspect, a method is described, implemented by one or more computing devices, for removing sensitive content from documents. The method includes: receiving one or more triggering events; initiating a document processing function in response to receipt of the triggering event(s), to provide an initiation instruction; retrieving one or more original documents to be processed in response to the initiation instruction; receiving one or more selection factors; identifying a modification strategy for use in removing sensitive content from the original document(s) in response to the selection factor(s), to provide a selected modification strategy; removing sensitive content from the original document(s) in accordance with the selected modification strategy and in accordance with an associated set of modification rules, to provide one or more modified documents, while preserving formatting and structure associated with the original document(s); and forwarding the modified document(s) to a computing mechanism that performs machine-implemented analysis on a basis of the modified document(s). One of the selection factors describes a characteristic of processing performed by the machine-implemented analysis.

According to a seventeenth aspect (depending from the sixteenth aspect), the set of modification rules provides an instruction to: identify an original character in a string in an original document; and replace the original character with a predetermined generic placeholder character, while preserving information regarding a property of the original character and/or the string in which the original character appears. The property is conveyed by a choice of the generic placeholder character itself and/or supplemental metadata that is associated with the generic placeholder character.

According to an eighteenth aspect (depending on the seventeenth aspect), the removing operation identifies each property in a set of properties that apply to the original character and/or the string in which the original character appears. The set of properties includes: a first property that indicates whether the original character is an uppercase alphabetical character; a second property that indicates whether the original character is a lowercase alphabetical character; a third property that indicates whether the original character is a numeric character; a fourth property that specifies a grammatical characteristic associated with the string; a fifth property that specifies a natural language associated with the original character and/or the string; a sixth property that specifies an author associated with the original character and/or the string; and a seventh property that specifies a semantic characteristic associated with the string.

According to a nineteenth aspect, a computer-readable storage medium is described for storing computer-readable instructions. The computer-readable instructions, when executed by one or more processor devices, perform a method that includes: receiving a triggering event that indicates that a user has commenced to interact with a particular application; initiating a document processing function in response to the receipt of the triggering event, to provide an initiation instruction; retrieving one or more original documents to be processed in response to the initiation instruction, the original document(s) being associated with the particular application; removing sensitive content from the original document(s) in accordance with an associated set of modification rules, to provide one or more modified documents, while preserving formatting and structure associated with the original document(s); and forwarding the modified document(s) to a computing mechanism that performs machine-implemented analysis on a basis of the modified document(s). The machine-implemented analysis is configured to produce a model for use with the particular application.

According to a twentieth aspect (depending on the nineteenth aspect), the removing operation involves identifying each property in a set of properties that apply to an original character and/or a string in which the original character appears, within an original document. The set of properties includes: a first property that indicates whether the original character is an uppercase alphabetical character; a second property that indicates whether the original character is a lowercase alphabetical character; a third property that indicates whether the original character is a numeric character; a fourth property that specifies a grammatical characteristic associated with the string; a fifth property that specifies a natural language associated with the original character and/or the string; a sixth property that specifies an author associated with the original character and/or the string; and a seventh property that specifies a semantic characteristic associated with the string.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data, such as password-protection mechanisms, etc.

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices comprising:
    a data store that maps different selection factors to different document modification strategies, the different document modification strategies specifying different document modification rules for automated transformation of sensitive content;
    a processing device; and
    a storage resource storing machine-readable instructions which, when executed by the processing device, cause the processing device to:
    initiate a document processing function in response to receipt of one or more triggering events, to provide an initiation instruction;
    retrieve one or more original documents for processing in response to the initiation instruction;
    based at least on a particular selection factor associated with a type of machine-trained model to be produced by a recipient entity, select, from the data store, a particular document modification strategy for use in transforming sensitive content in the one or more original documents, the particular document modification strategy specifying one or more particular document modification rules that preserve information in the one or more original documents that is suitable for producing the type of machine-trained model;
    transform sensitive content in the one or more original documents in accordance with the one or more particular document modification rules associated with the particular document modification strategy to provide one or more modified documents that preserve formatting and structure associated with the one or more original documents; and
    forward the one or more modified documents to the recipient entity over a communication conduit.

2. The one or more computing devices of claim 1,
    wherein one triggering event corresponds to an activation of a particular application,
    wherein the one or more original documents are associated with the particular application, and
    wherein the recipient entity corresponds to a computing mechanism that is configured to perform machine-implemented analysis on a basis of the one or more modified documents to generate the machine-trained model for use in conjunction with the particular application.

3. The one or more computing devices of claim 1,
    wherein the recipient entity is a computing mechanism that is configured to generate the machine-trained model on a basis of the one or more modified documents, and
    wherein the particular selection factor describes a characteristic of processing performed by the recipient entity.

4. The one or more computing devices of claim 1, wherein the machine-readable instructions, when executed by the processing device, cause the processing device to:
    identify another selection factor associated with the one or more original documents that describes a privacy requirement of a jurisdiction associated with the recipient entity; and
    select the particular document modification strategy is selected based at least on compatibility with the privacy requirement of the jurisdiction.

5. The one or more computing devices of claim 1, wherein the machine-readable instructions, when executed by the processing device, cause the processing device to:
    identify another selection factor associated with the one or more original documents that describes a preference of a user who is associated with the one or more original documents; and
    select the particular document modification strategy based at least on compatibility with the preference of the user.

6. The one or more computing devices of claim 1, wherein the one or more particular document modification rules provide an instruction to:
    identify an original character in a string in the one or more original documents; and
    replace the original character with a predetermined generic placeholder character, while preserving information regarding a property of the original character and/or the string in which the original character appears.

7. The one or more computing devices of claim 6, wherein the predetermined generic placeholder character is selected from a set of two or more possible generic placeholder characters, and wherein said preserving is performed by a choice of the predetermined generic placeholder character from among the set.

8. The one or more computing devices of claim 6, wherein the machine-readable instructions, when executed by the processing device, cause the processing device to:

preserve the information in the one or more original documents by associating supplemental metadata with the predetermined generic placeholder character, the supplemental metadata conveying the property.

9. The one or more computing devices of claim 6, wherein the machine-readable instructions, when executed by the processing device, cause the processing device to:
perform analysis on text in the one or more original documents to identify the property.

10. The one or more computing devices of claim 6, wherein the machine-readable instructions, when executed by the processing device, cause the processing device to:
identify and preserve each property in a set of properties that apply to the original character and/or the string in which the original character appears, wherein the set of properties includes:
a first property that indicates whether the original character is an uppercase alphabetical character;
a second property that indicates whether the original character is a lowercase alphabetical character; and
a third property that indicates whether the original character is a numeric character.

11. The one or more computing devices of claim 10, wherein the set of properties includes a grammatical property that specifies a grammatical characteristic associated with the string.

12. The one or more computing devices of claim 10, wherein the set of properties includes a language property that specifies a natural language associated with the original character and/or the string.

13. The one or more computing devices of claim 10, wherein the set of properties includes a semantic property that specifies a semantic characteristic associated with the string.

14. The one or more computing devices of claim 6, wherein a first particular document modification rule specifies a set of strings that are exempt from one or more other particular document modification rules.

15. The one or more computing devices of claim 1, wherein the one or more particular document modification rules provide an instruction to generate and preserve metadata that describes at least one characteristic of the one or more original documents.

16. The one or more computing devices of claim 1, wherein the machine-readable instructions, when executed by the processing device, cause the processing device to:
determine accuracies of a plurality of machine-trained models generated from a plurality of modified documents produced using a plurality of document modification strategies; and
select the particular document modification strategy from the plurality of document modification strategies based at least on the accuracies.

17. A method implemented by one or more computing devices, the method comprising:
accessing a data store that maps different selection factors to different document modification strategies, the different document modification strategies specifying different document modification rules for automated transformation of sensitive content in original documents;
receiving one or more triggering events;
initiating a document processing function in response to receipt of the one or more triggering events, to provide an initiation instruction;
retrieving a particular original document to be processed in response to the initiation instruction;
receiving one or more particular selection factors associated with the particular original document, the one or more particular selection factors including at least one selection factor identifying a type of subsequent machine-implemented analysis to be performed on a modified document derived from the particular original document, wherein the subsequent machine-implemented analysis involves generating a machine-trained model using the modified document;
mapping the one or more particular selection factors to a particular document modification strategy in the data store, the particular document modification strategy specifying one or more particular document modification rules that preserve information in the particular original document that is suitable for generating the machine-trained model;
transforming sensitive content from the particular original document in accordance with the one or more particular document modification rules specified by the particular document modification strategy, the transforming resulting in the modified document while preserving at least some formatting or structure associated with the particular original document; and
forwarding the modified document to a computing mechanism that is configured to generate the machine-trained model using the modified document.

18. The method of claim 17, wherein at least one of the one or more particular document modification rules provides an instruction to:
identify an original character in a string in the particular original document; and
replace the original character with a predetermined generic placeholder character, while preserving information regarding a property of the original character and/or the string in which the original character appears,
the property being conveyed by a choice of the predetermined generic placeholder character itself and/or supplemental metadata that is associated with the predetermined generic placeholder character.

19. The method of claim 18,
wherein the transforming identifies and preserves each property in a set of properties that apply to the original character and/or the string in which the original character appears, and
wherein the set of properties includes:
a first property that indicates whether the original character is an uppercase alphabetical character;
a second property that indicates whether the original character is a lowercase alphabetical character;
a third property that indicates whether the original character is a numeric character;
a fourth property that specifies a grammatical characteristic associated with the string;
a fifth property that specifies a natural language associated with the original character and/or the string;
a sixth property that specifies an author associated with the original character and/or the string; and
a seventh property that specifies a semantic characteristic associated with the string.

20. A computer-readable storage medium storing computer-readable instructions, the computer-readable instructions, when executed by one or more processor devices, causing the one or more processor devices to perform acts comprising:

retrieving a particular original document to be processed;

accessing a data store that maps different selection factors to different document modification strategies, the different document modification strategies specifying different document modification rules for automated transformation of sensitive content;

identifying one or more particular selection factors for processing the particular original document, the one or more particular selection factors including at least one selection factor relating to production of a machine-trained model using a modified document derived from the particular original document;

mapping the one or more particular selection factors to a particular document modification strategy in the data store, the particular document modification strategy specifying one or more particular document modification rules that preserve specific information in the particular original document that is suitable for production of the machine-trained model;

transforming sensitive content from the particular original document in accordance with the one or more particular document modification rules, the transforming resulting in the modified document and preserving the specific information; and providing the modified document to an entity for generating the machine-trained model.

21. The computer-readable storage medium of claim 20, wherein the transforming involves identifying and preserving each property in a set of properties that apply to an original character and/or a string in which the original character appears within the particular original document, and wherein the set of properties includes at least two of:
a first property that indicates whether the original character is an uppercase alphabetical character;
a second property that indicates whether the original character is a lowercase alphabetical character;
a third property that indicates whether the original character is a numeric character;
a fourth property that specifies a grammatical characteristic associated with the string;
a fifth property that specifies a natural language associated with the original character and/or the string;
a sixth property that specifies an author associated with the original character and/or the string; and
a seventh property that specifies a semantic characteristic associated with the string.

* * * * *